United States Patent [19]

Sokol

[11] Patent Number: 4,910,877
[45] Date of Patent: Mar. 27, 1990

[54] TUBE CURVATURE MEASURING PROBE AND METHOD

[75] Inventor: George J. Sokol, Scotia, N.Y.

[73] Assignee: The United States of America as represented by the United States Department of Energy, Washington, D.C.

[21] Appl. No.: 220,200

[22] Filed: Jul. 18, 1988

[51] Int. Cl.$^4$ .............................................. G01B 7/28
[52] U.S. Cl. ................................. 33/544; 33/DIG. 13
[58] Field of Search ................. 73/865.8; 33/542, 188, 33/544, 552, 554, 551, 178 F, 534, DIG. 13

[56] References Cited

U.S. PATENT DOCUMENTS

| | | | |
|---|---|---|---|
| 3,789,511 | 2/1974 | Groom et al. | 33/542 |
| 3,882,606 | 5/1975 | Kaenel et al. | 33/544 |
| 4,301,677 | 11/1981 | Fisher | 33/178 F |
| 4,651,436 | 3/1987 | Gaal | 33/542 |
| 4,715,128 | 12/1987 | Cummings et al. | 33/534 |

FOREIGN PATENT DOCUMENTS

1263717  2/1972  United Kingdom ............... 73/865.8

Primary Examiner—Robert R. Raevis
Attorney, Agent, or Firm—William W. Randolph; William R. Moser; Richard E. Constant

[57] ABSTRACT

The present invention is directed to a probe and method for measuring the radius of curvature of a bend in a section of tubing. The probe includes a member with a pair of guide means, one located at each end of the member. A strain gauge is operatively connected to the member for detecting bending stress exrted on the member as the probe is drawn through and in engagement with the inner surface of a section of tubing having a bend. The method of the present invention includes steps utilizing a probe, like the aforementioned probe, which can be made to detect bends only in a single plane when having a fixed orientation relative the section of tubing to determine the maximum radius of curvature of the bend.

14 Claims, 6 Drawing Sheets

TUBE CURVATURE MEASURING PROBE AND METHOD

BACKGROUND OF THE INVENTION

1. Field of Invention

The present invention is directed to a probe for measuring bends in a section of tubing. The probe is utilized to inspect tubing, such as utilized in a steam generator heat exchanger for detecting bends which occur in sections of straight tubing, for example during shutdown/refueling periods of a plant, indicating defects, damage and wear. The measurements made with the probe of the present invention are directly applicable to evaluation of tube stress levels to study stress corrosion cracking propensity of sections of tubing.

2. Description of Related Art

There exists many devices utilized for measuring the curvature and/or determining defects and wear in a section of tubing. Some devices use a plurality of fingers projecting radially from a cylindrical probe, which fingers ride on the inner surface of the section of tubing, to detect variations of the inner surface of the section of tubing as the probe is drawn through a length of tubing. The fingers in these previous devices are either mechanically or electrically coupled to an indicator and/or to a recording device for visually signaling to an operator that a defect is present. Other previously existing probes include a plurality of sections, with some sections serving as guide means, in which a mechanical or electrical detector senses variations in alignment between sections serving as guide means.

Various types of transducers have been utilized for detecting mechanical movement resulting from misalignment between guide sections of a probe. Also, strain gauges have been utilized for detecting movement of fingers contacting the inner surface of a section of tubing for detecting defects.

SUMMARY OF THE INVENTION

An object of the present invention is to produce an improved probe for accurately measuring the curvature of a section of tubing for indicating whether or not a defect or damage exists in that section of tubing.

Another object of the present invention is to produce a tube curvature measuring probe having two guide means with a member connected therebetween with a strain gauge mounted to the member for detecting deflections of the member resulting from forces exerted on the member as the probe encounters a bend in a section of tubing as the probe is moved to traverse a length of tubing.

A further object of the present invention is to produce a tube curvature measuring probe having two guide means, in which each guide means comprises a section of tube having a plurality of slits at both ends resulting in a plurality of resilient fingers for contacting the inner surface and accurately positioning each guide means within a section of tubing.

Another further object of the present invention is to produce a tube curvature measuring probe having two guide means with a flat spring located therebetween including a strain gauge mounted on the flat spring for detecting the deflection of the member resulting from forces exerted on the member from the guide means, in which the member is pivotally mounted to each guide means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENT

Figure 1:
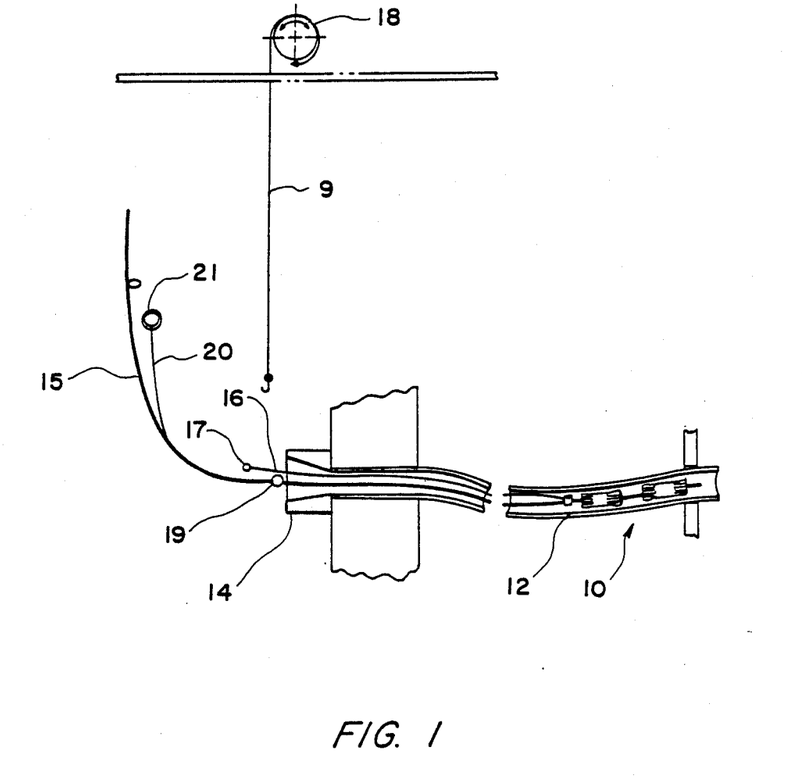
FIG. 1 shows the probe of the present invention inserted within a section of tubing having a bend.

In FIG. 1 is depicted a probe 10 of the present invention inserted within a section of tubing 12 having a bend therein. The probe is inserted within the section of tubing 12 by means of a tube alignment fixture 14 having an inner conical surface for directing the probe into the section of tubing. Extending from the probe 10, are lead wires 15 connected to strain gauges positioned on the probe and a cable 16 having an eye 17 for mechanically coupling the probe to a take-up reel 18 having a cable 9 with a hook for monitoring the depth of the probe while inside the section of tubing. Positioned on the lead wires 15 is a probe depth stop 19 for marking a predetermined distance that the probe will be inserted within the section of tubing or for marking the lead wires at a position at which either a bend and/or defect is discovered for determining the distance along the section of tubing at which the bend and/or defect was found upon removal of the probe from the section of tubing. The probe depth stop 19 is slidable along the length of the lead wires 15 for repositioning along the length of lead wires 15 for taking various length measurements. Combined with the lead wires 15 is control wire 20, made of for example spring wire, connected to a probe orientation handle 21. The probe orientation handle 21 is utilized by an operator for inserting the probe within the section of tubing for determining the radius of curvature of a bend in the tubing at a particular cross-sectional angle at a position within the section of tubing. Through repeated trials of the probe being passed through the region of the bend in the section of tubing (by first inserting the probe past the bent section and then completely withdrawing the probe from the tubing followed by rotating the probe a preselected angle before reinsertion) the maximum radius of curvature of the bend can be determined. At no time should the probe be rotated while inside the tubing to prevent damage to the instrumented part of the probe, especially at a severly damaged section of the tubing which would surely exert damaging torsional forces on the probe.

Figure 2:
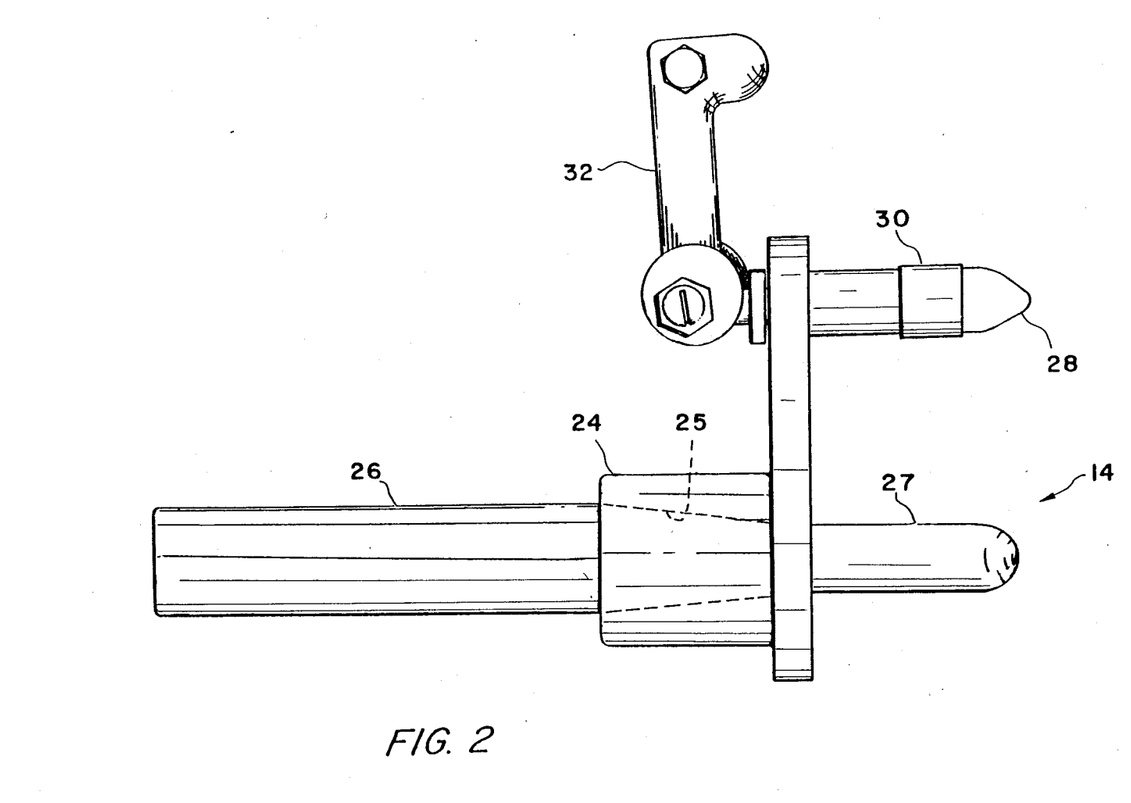
FIG. 2 is a top perspective view of a tube alignment fixture for guiding the probe of the present invention into a section of tubing.

Shown in FIG. 2, is a detailed embodiment of the tube alignment fixture 14 shown in FIG. 1. The tube alignment fixture 14 includes a probe funnel guide 24 having an inner conical surface 25. Inserted within the probe funnel guide 24, is a removable alignment rod 26 having an alignment end 27 received within a first portion of the section of tubing for aligning the tube alignment fixture 14 with respect to the section of tubing. The tube alignment fixture includes a clamping rod 28 which is received within an adjacent section of tubing, for example an adjacent section of tubing in a heat exchanger, for further aligning the tube alignment fixture 14 with respect to the section of tubing and for anchoring the tube alignment fixture to the section of tubing. The clamping rod 28 includes an expandable sleeve 30, preferably made of rubber, which is made to expand by means of a plunger positioned within the expandable sleeve which is connected to a cam lever 32. As the cam lever 32 is rotated approximately 90 degrees, the plunger is forced into an opening in the expandable sleeve 30 forcing it to expand and releasably engage with the adjacent section of tubing.

Figure 3A:
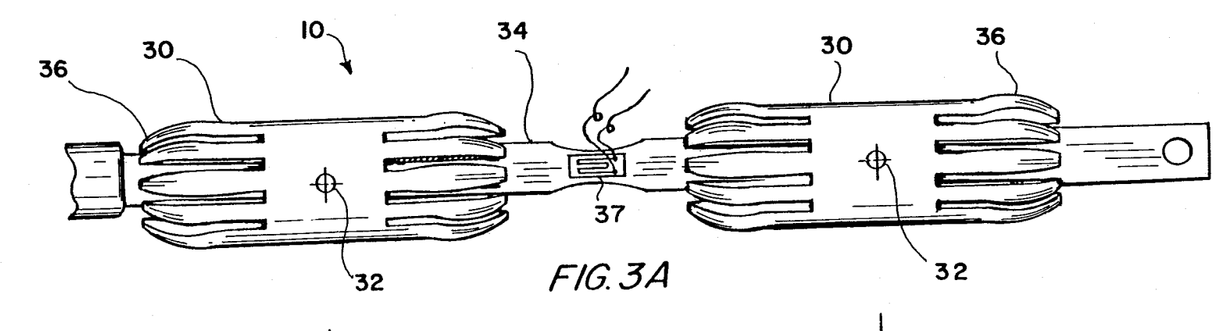
FIG. 3A shows a side view of a first embodiment of the probe of the present invention.
Figure 3B:
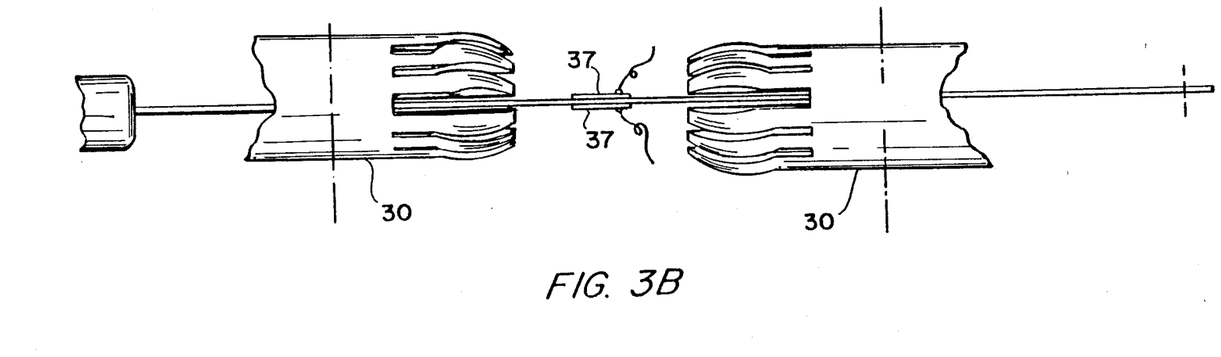
FIG. 3B is a top view of the first embodiment of the present invention shown in FIG. 3A.
Figure 3C:
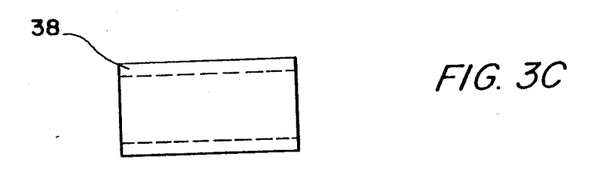
FIG. 3C is a guide spacer.

FIGS. 3A-3C depict a first embodiment of the probe of the present invention. The probe includes a pair of bore guide members 30 pivotably attached by means of pivot pins 32 to a thin elongated sheet of material, preferably spring steel (hereinafter referred to as flat spring 34). Each bore guide member 30 includes a plurality of flexible fingers 36, formed by a plurality of slits at each end of a bore guide member with each bore guide member preferably made of Nylon. The flexible fingers 36 are somewhat resilient and are biased against the inner surface of the section of tubing upon insertion of the probe within the section of tubing due to each flexible finger being cantilever mounted to the main cylindrical body of each bore guide member. The diameter of each guide member 30, at a position along the fingers 36, has a diameter greater than the diameter of the section of tubing, thus requiring the utilization of the probe funnel guide to bias the fingers inwardly for allowing the probe to enter one end of the section of tubing. The flat spring 34 is instrumented with electrical resistant strain gauges 37 which produce a voltage signal proportional to the radius of curvature of a bend in the section of the tubing. The cross-sectional area of the flat spring 34 at which the strain gauges are attached, is reduced to maximize the bending moment at that location. Tube curvatures are measured in the direction perpendicular to the flat surfaces of the flexible spring 34 requiring several passes with different probe orientations to obtain the maximum bending configuration of the tubing.

Possible probe damage by tubing bends in directions, other than perpendicular to the flat surfaces of the flat spring, is prevented by attaching the instrumented flat spring 34 to the bore guide members 30 with pivot pins 32 allowing the bore guide members to freely rotate about plus or minus 30 degrees relative the flat spring 34. A bore guide spacer 38 is positioned between bore guide members 30 to prevent damage to the flat spring in the axial direction, damage to the strain gauges and damage to the mechanical connection in between the strain gauges and flat spring during insertion (push in direction) of the probe into the section of tubing. The probe is inserted manually preferably using a 0.060 inch diameter, 30 inch long spring wire 20 (FIG. 1) attached to the trailing edge of the probe. Several size wires were tested and this size was found to be flexible enough to make the required bends and still be rigid enough to prevent undesirable twisting of the probe.

Figure 4A:
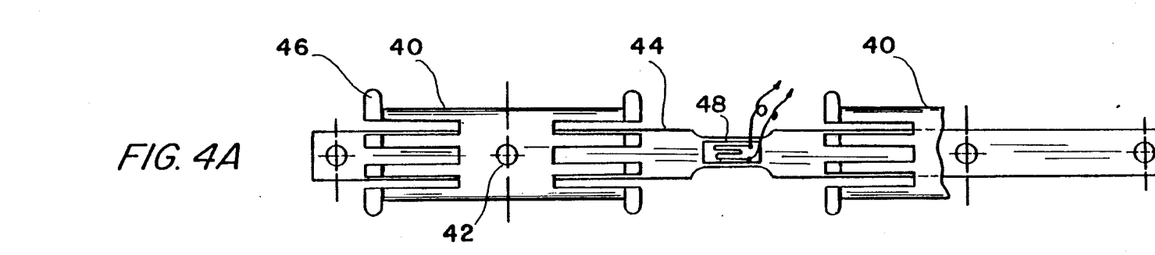
FIG. 4A is a side view of a second embodiment of the probe of the present invention.
Figure 4B:
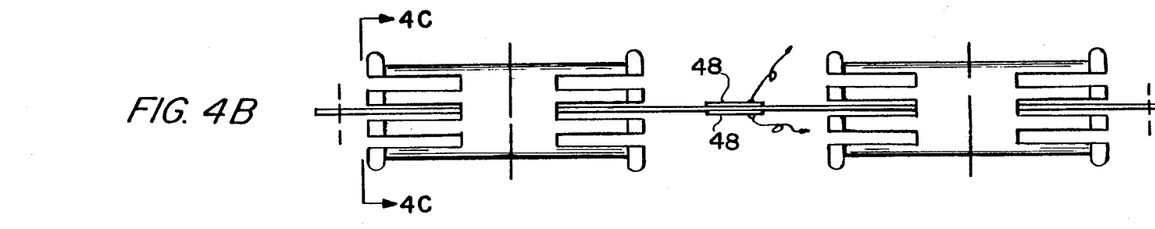
FIG. 4B is a top view of the second embodiment of the probe shown in FIG. 4A.
Figure 4C:
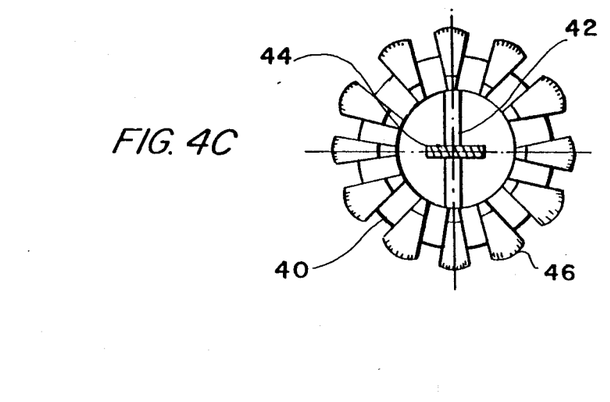
FIG. 4C is an end view of the probe shown in FIG. 4B.
Figure 4D:
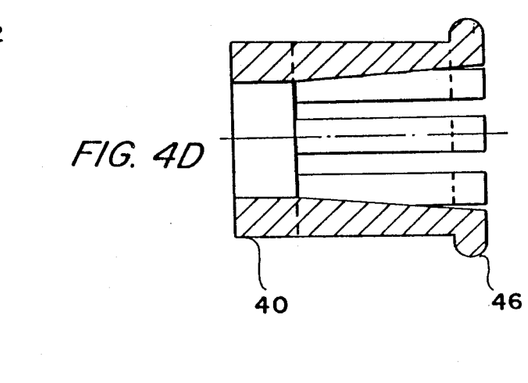
FIG. 4D is a cross-sectional view of a portion of one of the guide members shown in FIGS. 4A and 4B.

FIGS. 4A-4D depict a second embodiment of the probe of the present invention having a pair of bore guide members with a plurality of flexible fingers 46 at each end of the flat spring 44. The bore guide members 40, as well as the bore guide members in other embodiments of the present invention, are preferably made of Nylon. The strain gauges 48 are bonded to the flat spring with adhesive for accurate measurement of the bending strain of the flat spring. FIG. 4C shows the flat spring 44 suspended within a bore guide member 40, having a plurality of equally spaced flexible fingers 46, by means of pivot pin 42. As shown in FIG. 4D, a section of the bore guide member 40 at which the flexible fingers 46 are located, is tapered towards the end of the bore guide member to allow a greater angle of pivotable movement of the flat spring 44 rotating about the pivot pin 42 within the bore guide member 40.

Figure 5A:
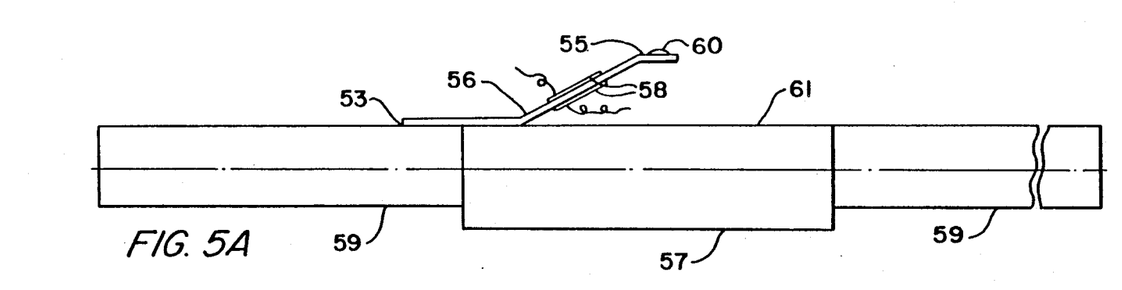
FIG. 5A is a top view of a third embodiment of the probe of the present invention.
Figures 5B, 5C:
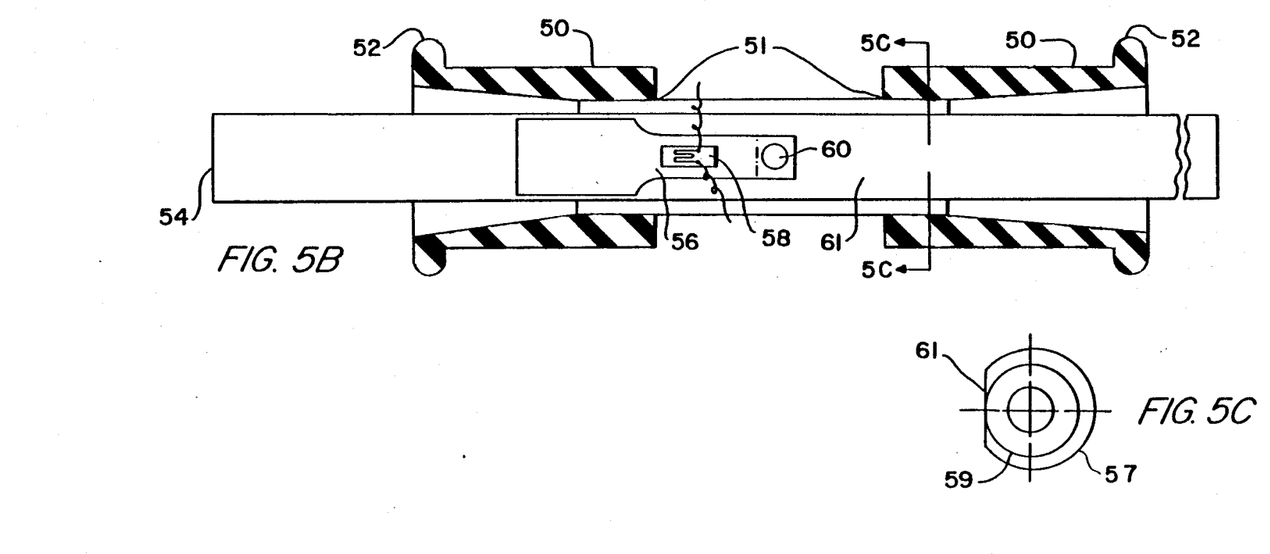
FIG. 5B is a side view of the probe shown in FIG. 5A.
FIG. 5C is a cross-sectional view of the probe shown in FIG. 5B.

Shown in FIGS. 5A-5C is a third embodiment of the probe of the present invention. The probe includes a pair of bore guide members 50, which can each have a plurality of flexible fingers 52 at one end, securely mounted to a shaft 54, having a thickened portion 57, ends 59 and a flat side 61. A flat spring 56 is mounted to the flat side 60 of shaft 54, preferably with adhesive 53, with strain gauges 58 mounted thereon for detecting bending strain of the flat spring 56. A button 60, preferably made of Nylon, is attached to one end of the flat spring 56 preferably with adhesive 55. The flexible fingers 52 located in the same plane as the Nylon button 60 and the center axis of the shaft 54, are rigidly fixed to the shaft 54 to prevent relative movement between those particular flexible fingers and the shaft. This prevents erroneous measurements by the strain gauges due to the deflection of the flexible fingers in the aforementioned plane as opposed to the sole deflection of the flat spring 56 in that plane.

Figures 6A, 6B:
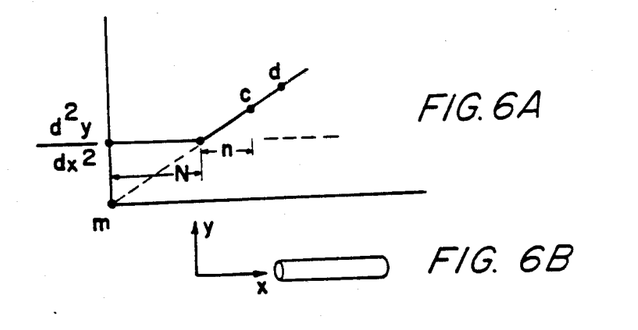
FIG. 6B shows a schematic diagram of the bridge circuit of the strain gauge utilized in the present invention.
Figure 6C:
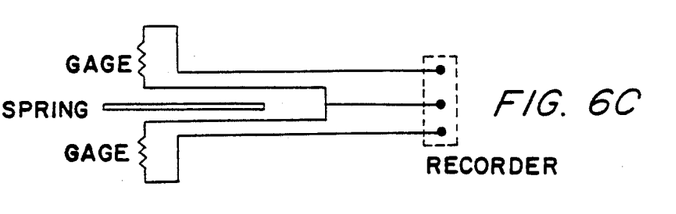

Shown in FIG. 6B is shown a schematic diagram representation of the strain gauge bridge circuit utilized in the present invention. Two strain gauges are positioned on either side of the spring to increase sensitivity of the circuit.

PROBE CALIBRATION

The probe is calibrated in terms of micro inch/inch spring deflection versus radius of tube curvature. Initial development work has shown tubing curvatures to be inversely proportional to the spring deflections. The calibration is to be made using bent samples of identical steam generator tubing with known radii of curvatures. A sample calibration made using a "Sandborn 321" strip chart recorder and a section of steamed generator tubing with a fully reverse bend of 7.46 inches and 5.85 inches center lined radii measured 3,000 and 2,600 micro inch/inch respectfully. The results were repeatable.

TUBE INSPECTION

The probe is designed to measure the magnitude and direction of bending in the tubing and will not produce an actual profile of the tube without some method of continuous tracking and analysis of the data. FIG. 1 illustrates a method of correlating the curvature measurement with its location in the tube.

The probe assembly is manually guided into the designated tube with the tube alignment fixture shown in FIG. 2. The desired inspection depth is pre-set with the probe depth stop 19 which is preferably a small adjustable bar attached to the control wire 20. Cable 16 is then connected to the cable 9, by means of the hook, with sufficient rotary tension on the take-up reel 18 to eliminate slack in the cables. The take-up reel monitors the depth of the probe as it is inserted and manually moved within the tubing by control wire 20. Bends in the tubing are examined on one longitudinal plane during each probe insertion cycle. The angle of the probe is changed before reinsertion and the process is repeated until a profile of the tubing is determined. An electrical signal generated by the rotary motion of the reel and the electrical signals generated from the strain gauges are connected to the axis of an X—Y recorder to simultaneously record the probe curvature measurement and its location in the tube. As these measurements are simultaneously made, unavoidable rate variations of a manually controlled probe will not become a factor in the data evaluation. The literature is currently being reviewed to determine the best technique for converting the rotary motion of the take-up reel to an electrical signal compatible with the X—Y recorder.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tube curvature measuring probe comprising:
   a pair of bore guide members;
   a flexible member pivotally connected at a first end to one bore guide member and said member pivotally connected at a second end to the other bore guide member; and
   a first strain gauge operably connected to said member at a position between said ends of said member for detecting bending strains in said member due to forces exerted on said probe as said probe is moved through a section of tubing in engagement with an inner surface of said section of tubing and upon encountering a bend in said section of tubing.

2. The probe according to claim 1, wherein each bore guide member is cylindrical in shape including a plurality of flexible fingers formed by a plurality of slots at each end of each said bore guide member for providing self-aligning, low friction bore guide members.

3. The probe according to claim 2, wherein the flexible fingers are equally spaced around the circumference of each of said bore guide members.

4. The probe according to claim 2, wherein each bore guide member is made of Nylon.

5. The probe according to claim 1, wherein said member is an elongated flat spring whereby bending forces are exerted on said flat spring by said pair of bore guide members encountering a bend in the section of tubing, and wherein said first strain gauge is mounted to said flat spring.

6. The probe according to claim 5, including a second strain gauge mounted on the opposite side of said flat spring at a position along the length of said flat spring at which said first strain gauge is mounted for increasing the sensitivity of the strain gauges and for providing each strain gauge with a temperature compensator for the other.

7. The probe according to claim 5, including a cylindrical shaped bore guide spacer positioned about said flat spring and inbetween said pair of bore guide members for preventing damage to said flat spring, during insertion of the probe into the section of tubing.

8. The probe according to claim 1, including means for detecting signals from said strain gauge for indicating to an operator that a bend exists in the section of tubing at a location.

9. The probe according to claim 1, further comprising:
   a lead wire extending from said probe for transmitting signals from said strain gauge;
   a control wire connected to said probe for moving said probe within the section of tubing for determining the radius of curvature of a bend at different orientations within the section of tubing;
   a cable having a first end connected to said probe; and
   a take-up reel connected to a second end of said cable for exerting substantially a constant tension on said probe for drawing the probe through said section of tubing at a predetermined rate.

10. A tube curvature measuring probe comprising:
    a pair of bore guide members;
    a member connected at a first end to one bore guide member and said member connected at a second end to the other bore guide member; and
    a first strain gauge operably connected to said member at a position between said ends of said member for detecting bending strains in said member due to forces exerted on said probe as said probe is moved through a section of tubing in engagement with an inner surface of said section of tubing and upon encountering a bend in said section of tubing, wherein said member is an elongated flat spring whereby bending forces are exerted on said flat spring by said pair of bore guide members encountering a bend in the section of tubing and wherein said first strain gauge is mounted to said flat spring, and wherein said flat spring is pivotally mounted to each bore guide member.

11. The probe according to claim 10, wherein said bore guide members are each pivotably mounted to said flat spring along parallel pivotal axes for only allowing forces to operate on said flat spring that will result in bending of said flat spring in a single plane perpendicular to said pivotal axes, for preventing possible damage to said flat spring due to tubing bends in other directions.

12. The probe according to claim 27, wherein said probe is pivotably mounted to each bore guide member to allow approximately plus or minus 30 degrees of movement of each bore guide member relative to said flat spring.

13. The probe according to claim 12, wherein said flat spring has a reduced cross-sectional area at a position where said strain gauge is mounted to said flat spring for maximizing the bending moment of the flat spring at that location.

14. The probe according to claim 12, wherein said member is made of spring steel.

* * * * *